Patented May 1, 1934

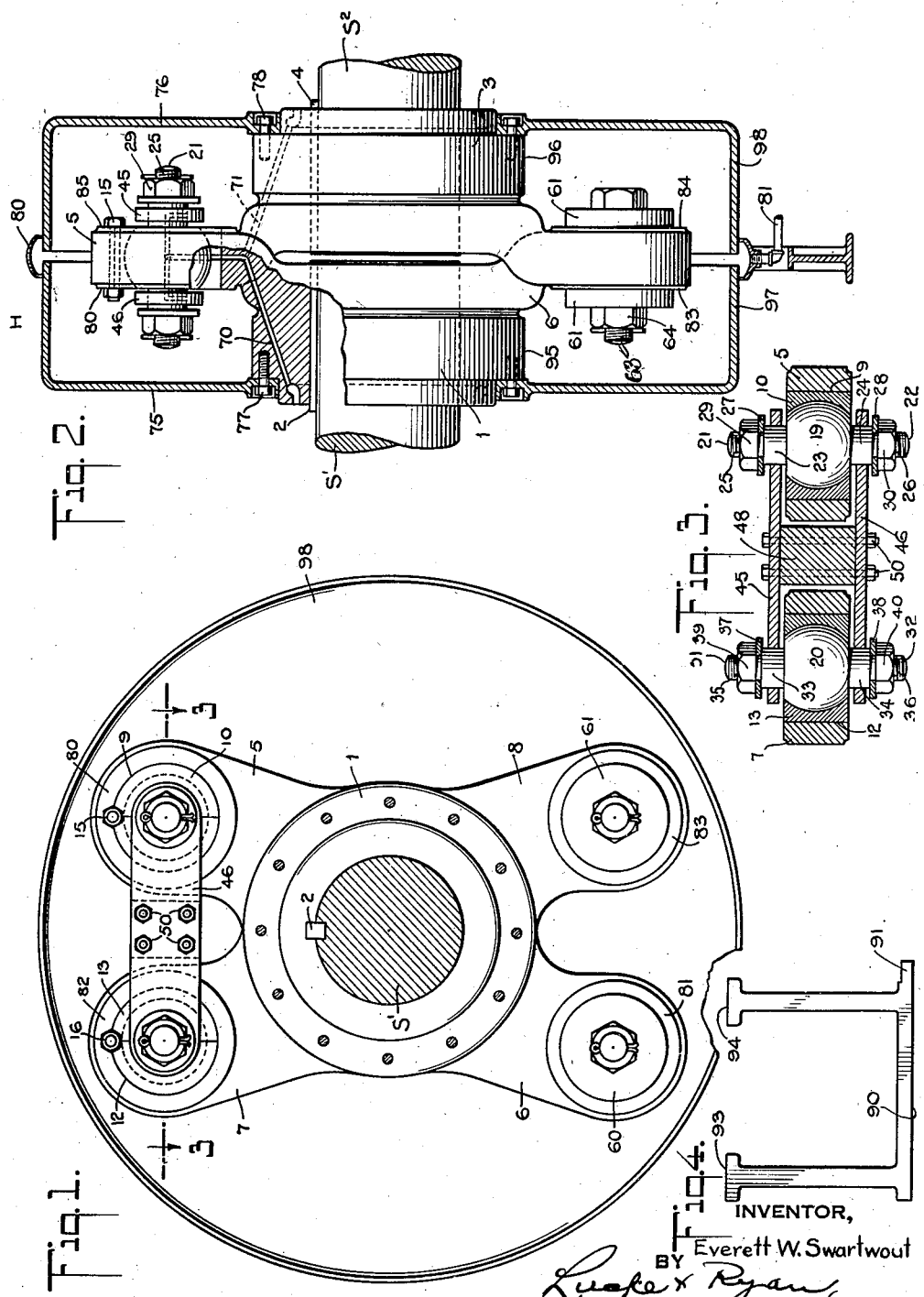

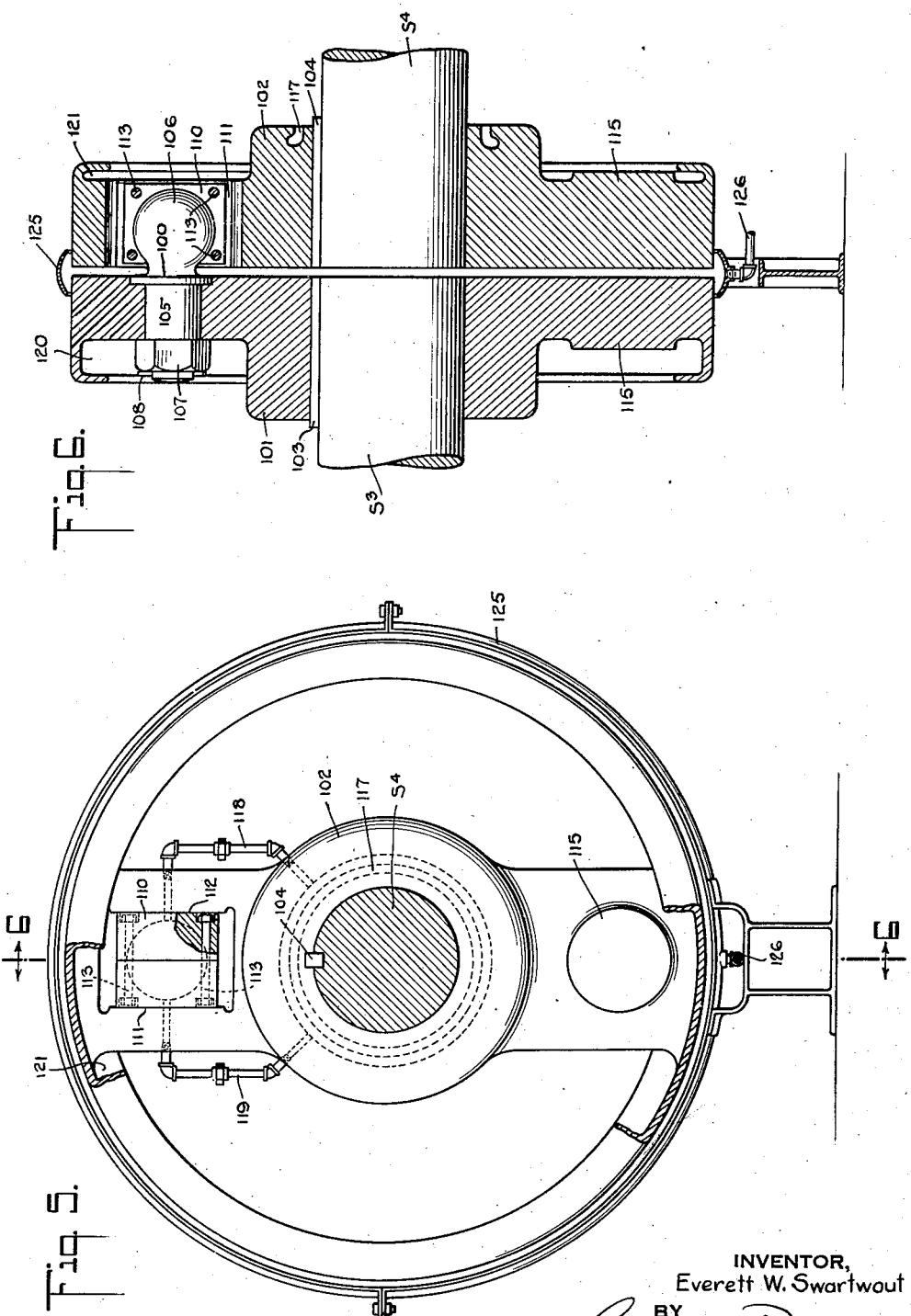

1,957,300

UNITED STATES PATENT OFFICE 1,957,300

FLEXIBLE SHAFT COUPLING

Everett W. Swartwout, White Plains, N. Y.

Application September 27, 1929, Serial No. 395,564

6 Claims. (Cl. 64—97)

This invention relates to shaft couplings of that type known as flexible couplings which are adapted to compensate for slight misalignment due perhaps to an improper initial setting of the shafts, uneven settling of the foundations of the machines in which the shafts are operating, wear of the bearings which support the shaft, or perhaps bending of the shafts due to stresses acting thereon during operation of the mechanism.

An object is to provide a coupling which is simple and rugged in construction and which does not depend upon flexible material, such as fibre or rubber to accomplish its purpose.

Another object is to provide a coupling which will transmit power from one shaft to another when these shafts may or may not be in perfect axial alignment to permit free lateral movement of one shaft relative to the other, either or both of which may occur when the two shafts are parallel but out of center, or, when the shafts are in center but out of line, or when the shafts are out of line and out of center.

Another object is to provide a coupling which will transmit power in either a clockwise or counterclockwise direction of rotation, as in reversing service, without back lash, noise, excessive clearance, additional loads on the shafts and their bearings other than those due to the weight of the parts supported and due to the torque required to be transmitted, or without causing injurious strains on the coupling parts themselves.

Another object is to provide a coupling which is perfectly self-aligning throughout a complete revolution, even though the shafts be relatively displaced laterally or axially in parallel planes or at an angle to each other.

Another object is to provide a coupling which transmits torque tangentially and uniformly between the shafts at all points around the circumference of a revolution in a manner similar to that of an engine crank at or near its most favorable position, so as to uniformly distribute the load and heating effect around the bearings at the different points in the revolution of the shafts.

Another object is to provide a coupling which will transmit the torque substantially tangentially through one universal connection utilizing spherical connecting means between two crank members on the two respective shafts which it is desired to connect together.

And still a further object is to provide a coupling which may be easily and accurately utilized to align and level the respective shafts when operating or when being erected and which has a neat, protecting enclosure, and which is perfectly balanced and effectively lubricated without leakage.

Further features and objects of the invention will be more fully understood from the following detail description and the accompanying drawings, in which Fig. 1 is an end elevation of a flexible coupling.

Fig. 2 is a side elevation partly in section, of the coupling shown in Fig. 1.

Fig. 3 is a section taken through 3—3 of Fig. 1.

Fig. 4 is an end elevation of a tool adapted to be used in leveling up the shafts and coupling.

Fig. 5 is an end elevation partly in section of another embodiment of my invention.

Fig. 6 is a section through 6—6 of Fig. 5.

Looking at Figs. 1, 2 and 3, S1 discloses a shaft which is adapted to be connected by means of a flexible coupling to shaft S2. The coupling comprises a collar portion 1, adapted to be secured to shaft S1 by means of a key 2 and a collar portion 3 adapted to be secured to shaft S2 by means of a key 4.

Attached to collar portion 1 are a pair of arms 5 and 6 diametrically disposed in regard to each other about shaft S1, and attached to collar portion 3 are a pair of arms 7 and 8 likewise diametrically disposed to each other about shaft S2. Arm 5 is recessed at 9 to receive split spherical bearing housing 10 and arm 7 is likewise recessed at 12 to receive a similar split spherical bearing housing 13.

These bearing housings are split in order to allow the spherical bearings to be assembled in the respective arms and after assembly are secured in place by means of bolts 15 and 16 which pass through arms 5 and 7 respectively and serve to hold the split spherical bearing housings in place.

The spherical bearing for arm 5 is shown at 19, Fig. 3, and for arm 7 at 20 and spherical bearing 19 has attached thereto pin members 21 and 22 extending from opposite sides thereof and comprising cylindrical bearing portions 23 and 24 and threaded reduced portions 25 and 26 adapted to cooperate with the bearing portions 23 and 24 to form suitable collars against which retaining washers 27 and 28 may be held by nuts 29 and 30. Spherical bearing 20 is likewise equipped with pins 31 and 32 made up of bearing portions 33 and 34, and reduced threaded portions 35 and 36 adapted to form with the enlarged bearing portion a collar against which washers 37 and 38 may be held by nuts 39 and 40.

The spherical bearings are connected together by links 45 and 46, each of which is drilled at each end thereof to slip over and closely engage bearing surfaces 23, 24, 33 and 34, with a sliding fit, as clearly shown in Figs. 1, 2 and 3. Links 45 and 46 are maintained a constant distance apart and clamped together so that they will move and act together by means of a block 48 placed therebetween as shown in Fig. 3, and suitable securing bolts 50 adapted to pass through links 45 and 46 and securing block 48 and clamp the whole into one unitary structure.

It should be noted at this point that a clearance has been left between washers 27 and 28, 37 and 38, and the respective shoulders of the spherical bearings to allow for a certain amount of lateral motion on the part of links 45 and 46 along the bearing surfaces 23, 24, 33 and 34. The usual cotter pins are shown to lock the nuts 29 and 30, 39 and 40 in place so that they will not become disengaged due to vibration or motion of the coupling.

Arms 6 and 8 are equipped with counterweights 60 and 61 which may be secured thereto by an ordinary bolt and nut, as shown at 63 and 64 (Fig. 2).

Oil grooves are illustrated at 70, 71, which enable oil to be fed from the exterior of the coupling up through the arms thereof to the spherical bearings and from the spherical bearings to the bearing surfaces 23, 24, 33 and 34, as indicated in the dotted lines, Fig. 2. Surplus oil which is thrown off from the bearing surfaces, due to the centrifugal action which is present when the coupling is rotating, is collected in the housing H which is made up of two parts 75 and 76, the former being secured to collar 1 and the latter to collar 3 by suitable screws or bolts 77 and 78. This split housing in turn is surrounded by an oil groove 80 so as to encompass the split or opening between the two halves of the housing and any oil which collects in the housing will be forced out of the opening between the two halves thereof and collected in the stationary oil groove 80 and flow from thence down to the outlet pipe 81. It should be understood that when the shafts S1 and S2 are in substantial alignment, the movement of the parts with respect to each other will be extremely small or practically negligible, and therefore lubrication will ordinarily be unnecessary. Where the misalignment is greater the lubrication system described above may be found necessary so I have seen fit to describe it.

When the shafts are in alignment a vertical plane passing through the center of both spherical bearings will engage the common axis of the shafts at right angles and will be spaced half way between the complemental coupling halves which are attached to each shaft.

At Fig. 4 is illustrated a tool which may conveniently be used in checking the alignment of the shafts or in erecting a machine to produce proper alignment of the shafts. The bottom thereof, that is surface 90, may be laid across the periphery of the split coupling housing H, for instance across the surfaces 97 and 98, parallel to shafts S1 and S2 in order to determine if the shafts S1 and S2 have a common center. End 91 is of such thickness that it will just slip between the split portions of the housing H and serve to gauge the space between the split portions which should be equal at all points around the circumference of the housing. The surfaces 93 and 94 of the tool are in line with each other on a common plane and are spaced apart so that they are adapted to co-operate with surfaces 95 and 96 of collars 1 and 3 respectively, so as to check up the alignment of these collars with each other. Of course this last test must be made when the housing H is removed from the coupling. As an additional check on the alignment of the shafts arms 5, 6, 7 and 8 may be equipped with machined flat surfaces commonly known as "pads" and shown at 80, 81, 82 and 83 across which a straight edge may be placed. Likewise the opposite sides of these arms may be equipped with machined surfaces as illustrated at 84 and 85 in Fig. 2.

In Figs. 5 and 6 I have illustrated another embodiment of my invention which comprises two disk-like members 101 and 102 adapted to be keyed to shafts S3 and S4 respectively, by means of keys 103 and 104. Member 101 is adapted to carry a bolt 105 with a spherical head or bearing 106 protruding therefrom and bolt 105 is firmly secured to member 101 by means of nut 107 and collar 100. Nut 107 may be locked in place by the usual cotter pin 108. Member 102 is equipped with a split spherical bearing housing 110 which is adapted to receive spherical head 106 and which is also adapted to move freely in any direction within the confines of the walls 111 and 112 which are carefully machined to make a nice sliding fit for the split spherical bearing housing 110, thus the bearing housing 110 may move up or down and back and forth within the confines of walls 111 and 112 or may move so that the bounding surfaces thereof will be angularly disposed in regard to the edge of the walls 111 and 112. The halves of split bearing housing 110 are shown connected together by countersunk bolts 113. A counterweight 115 may be formed upon each of the coupling discs 101 and 102 so as to perfectly balance the same. Lubrication of the spherical bearing and of the side walls 111 and 112 may be accomplished by means of an oil groove 117 which is connected by suitable pipes 118 and 119 to the side walls 111 and 112 and through suitable grooves shown in the dotted lines in Fig. 5 to the spherical bearing surface itself. The centrifugal action which is set up by the rotation of the coupling is sufficient to force oil which is admitted to groove 117 through the pipes 118 and 119 to the bearing surfaces. Excess oil which is thrown off from the spherical bearing and the spherical bearing housing may be collected in annular circumferential grooves which are built into and form part of coupling discs 101 and 102, such as grooves 120 and 121 respectively, and any oil which may escape between the coupling discs may be collected in a stationary oil groove 125 which has a pipe 126 attached thereto to drain off any surplus oil.

Thus, by means of this construction the shafts S3 and S4 may be moved laterally with respect to each other, and also at an angle with respect to each other as when out of parallel and axially out of alignment, and torque is transmitted tangentially from one shaft to the other, in either a clockwise or counterclockwise direction of rotation, and without strain on the parts or the shafts.

The coupling illustrated in Figs. 5 and 6 may be aligned with a straight edge laid on the peripheral surfaces of the discs, and by equalizing the opening between the discs all around the circumference thereof.

Looking at Fig. 6 it is apparent that this type of coupling does not require a separate housing, inasmuch as the coupling discs and especially the grooves 120 and 121 form a protection for the spherical bearing and bearing housing and the nut 107 and the bolt 105 so that there are no protruding parts which might catch in the clothing of an operator of the machine of which the coupling forms a part.

I claim:—

1. Combined self-aligning and flexible coupling means for interconnection of a driving shaft and a driven shaft, comprising a pair of substantially duplicate cylindrical members arranged to be respectively connected to the driving shaft and the driven shaft, and single interconnection means interconnecting said members at locations respectively on said members remote from the axial centers of the said members, said interconnection means constituting the sole interconnection between said members and the shafts, said interconnection means including a ball and radially and laterally slidable socket means.

2. Combined self-aligning and flexible coupling means for interconnection of a driving shaft and a driven shaft, comprising a pair of substantially duplicate cylindrical members arranged to be respectively connected to the driving shaft and the driven shaft, and single interconnection means interconnecting said members at locations respectively on the opposed faces of and within the peripheral margin of said members remote from the axial centers of the said members, said interconnection means constituting the sole interconnection between said members and the shafts, said interconnection means including a ball and radially and laterally slidable socket means.

3. The combination with a driving shaft and fixed bearing means therefor, a driven shaft and fixed bearing means therefor, of members arranged to be respectively connected to the driving shaft and to the driven shaft, and single interconnection means interconnecting said members at locations respectively on said members remote from the axial centers of said members, said interconnection means constituting the sole interconnection between said members and the shafts, said interconnection means permitting axial and lateral movement of said shafts with respect to each other, said interconnection means including elements for removably connecting said single interconnection means with said members respectively to afford relative positioning of either shaft with respect to the other shaft without disturbance of their fixed bearing means.

4. Combined self-aligning and flexible coupling means for interconnection of a driving shaft and a driven shaft, comprising a pair of substantially duplicate cylindrical members arranged to be respectively connected to the driving shaft and the driven shaft, and single interconnection means interconnecting said members at locations respectively on said members remote from the axial centers of the said members, said interconnection means constituting the sole interconnection between said members and the shafts, said interconnection means including a radial slot in one of the cylindrical members, a ball socket bearing member slidably mounted therein, a perforation in the other cylindrical member and located radially of the axis of said member a distance substantially equal to the medial radial distance of the slot in said one cylindrical member, means extending through said perforation and secured to said other cylindrical member and extending laterally of the face of said other cylindrical member and toward the face of the said one cylindrical member, and a ball bearing carried by the end of the lateral extending means and housed within the ball socket bearing member.

5. Combined self-aligning and flexible coupling means for interconnection of a driving shaft and a driven shaft comprising a pair of members arranged to be respectively connected to the driving shaft and the driven shaft, and single interconnection means interconnecting said members at locations respectively on said members remote from the axes of said shafts, said interconnection means including a radial slot in one of said members, a ball socket bearing member slidably mounted therein radially and parallel to the axis of its associated shaft, a perforation in the other said member and located radially of the axis of its associated shaft a distance substantially equal to the medial radial distance of the radial slot in the said other member, means extending through said perforation and secured to its associated member and extending laterally toward the other member, and a ball bearing carried on the end of the laterally extending means and housed within the ball socket bearing member.

6. Combined self-aligning and flexible coupling means for interconnection of a driving shaft and a driven shaft, comprising a pair of members arranged to be respectively connected to the driving shaft and the driven shaft, and single interconnection means interconnecting said members at locations respectively on said members remote from the axes of said shafts, said interconnection means including a radial slot in one of said members, a ball socket bearing member slidably mounted therein radially and parallel to the axis of its associated shaft and in all intermediate angles therebetween in the plane in which lies the said slot and ball socket bearing member, a perforation in the other said member and located radially of the axis of its associated shaft a distance substantially equal to the medial radial distance of the radial slot in the said other member, means extending through said perforation and secured to its associated member and extending laterally toward the other member, and a ball bearing carried on the end of the laterally extending means and housed within the ball socket bearing member.

EVERETT W. SWARTWOUT.